United States Patent [19]

Persbacker

[11] Patent Number: 5,214,868
[45] Date of Patent: Jun. 1, 1993

[54] APPARATUS FOR LAYING AN UNDERGROUND MEMBER

[76] Inventor: Richard H. Persbacker, 19602 Holly La., Lutz, Fla. 33549

[21] Appl. No.: 826,476

[22] Filed: Jan. 27, 1992

[51] Int. Cl.$^5$ .............................. E02F 5/08; E02F 5/10; F16L 1/00
[52] U.S. Cl. ................................. 37/94; 37/193; 405/174; 405/183; 172/350; 172/352
[58] Field of Search .............. 405/174, 180, 181, 182, 405/183; 37/91, 94, 100, 189, 193; 111/121; 172/349, 350, 352

[56] References Cited

U.S. PATENT DOCUMENTS

| | | | |
|---|---|---|---|
| 18,551 | 11/1857 | Moore | 37/94 |
| 298,223 | 5/1884 | Milner | 37/94 |
| 404,301 | 5/1889 | Powers | 37/94 |
| 867,270 | 10/1907 | Himble | 37/193 |
| 2,428,188 | 9/1947 | Williams | 172/352 |
| 3,066,491 | 12/1962 | Ryan | 405/183 X |
| 3,323,313 | 6/1967 | Owens | 405/174 |
| 3,460,350 | 8/1969 | Speiser et al. | 405/183 |
| 3,611,730 | 10/1971 | Brettrager | 37/94 X |
| 4,537,531 | 8/1985 | Diefenthaler | 405/174 |
| 4,825,569 | 5/1989 | Porter | 37/142.5 |

FOREIGN PATENT DOCUMENTS

| | | | |
|---|---|---|---|
| 346783 | 1/1922 | Fed. Rep. of Germany | 172/352 |
| 393741 | 4/1924 | Fed. Rep. of Germany | 172/352 |
| 2015622 | 1/1972 | Fed. Rep. of Germany | 405/174 |

Primary Examiner—Randolph A. Reese
Assistant Examiner—Arlen L. Olsen
Attorney, Agent, or Firm—Frijouf, Rust & Pyle

[57] ABSTRACT

An apparatus is disclosed for laying an underground member such as a service wire, tubing or the like. The apparatus includes a frame having a plurality of wheels with a rotatable cutting blade and a fixed cutting blade mounted to the frame for extending below the surface of the ground. The underground member is secured to the fixed cutting blade. An operating handle is pivotably mounted to the frame for rotating the rotatable cutting blade upon a pivoting of the operating handle. A propelling arm is pivotably mounted relative to the operating handle for moving the apparatus over the surface of the ground concomitantly with the rotatable cutting blade and the fixed cutting blade cutting a trench and laying the underground member therein.

13 Claims, 7 Drawing Sheets

APPARATUS FOR LAYING AN UNDERGROUND MEMBER

BACKGROUND OF THE INVENTION

1. Field Of The Invention

This invention relates to earth excavation and more particularly to an improved hand operated apparatus for laying an underground tubing or cable.

2. Prior Art

The present trend in the communication industry is to bury service wires such as telephone wires, fiber optic wires, television coaxial cables, electrical wires or the like. The burying of service wires is preferred over wires suspended from poles due to higher a service reliability and a concealment of the service wires.

Typically, a service wire is buried between a first and a second terminal or buried between a terminal and a building. Normally, the distance that the service wire is buried is a relatively short distance on the order of fifty feet to two hundred feet at a depth of only six to twelve inches.

The most common method of burying a service wire for a relatively short distance is through the use of a shovel and a small stick. The shovel is inserted into the ground and the shovel is tilted to create a narrow V-shape groove in the ground. Successive insertions and tilting of the shovel ultimately create a narrow V-shape groove between the desired points of connection. The small stick is used to push the service wire to the bottom of the narrow V-shape groove.

Although motorized trenching equipment is readily available in the art, the transportation and use of heavy and complex motorized trenching equipment is not practical when the service wire is buried a relatively short distance at a minimal depth.

Others in the prior art have attempted to provide simple, hand powered plows for creating trenches at a minimum depth for a relatively short distance. U.S. Pat. No. 18,551 to Moore discloses an excavator incorporating a rotatable wheel having shovels.

U.S. Pat. No. 298,223 to Milner discloses a ditching machine having a wheel mounted on a frame.

U.S. Pat. No. 404,301 to Powers discloses a ditching machine incorporating a rotatable wheel for excavating a trench.

U.S. Pat. No. 2,428,188 to Williams discloses a lever plow incorporating a lever for providing forward movement to the plow upon operation of the lever.

U S. Pat. No. 3,323,313 to Owens discloses a device for laying underground tubing and cable incorporating a freely rotatable coulter and a fixed cutting blade.

U S. Pat. No. 3,460,350 to Speiser et al discloses an irrigating apparatus having a plow blade and incorporating a pivotable operating handle connected to an arm for moving the apparatus over the ground.

U.S. Pat. No. 4,537,531 to Diefenthaler discloses a tile layer apparatus associated with a trenching machine.

U.S Pat. No. 4,825,569 to Porter discloses a trench digging apparatus for laying a cable and for filling the trench utilizing a motor powered rotating blade.

Although the foregoing device have contributed to the prior art, none of these device has solved the need for a simple, low cost and easily transportable device for laying an underground member.

Therefore, it is an object of the present invention to provide an improved apparatus for laying an underground tubing or cable having an operating handle for simultaneously cutting a trench, placing the tubing or cable within the trench and advancing the apparatus over the ground.

Another object of this invention is to provide an improved apparatus for laying an underground tubing or cable that creates a narrow trench sufficient for burying a tubing or a cable with minimum disturbance to the sward.

Another object of this invention is to provide an improved apparatus for laying an underground tubing or cable that is light weight and easily transportable by a sole operator.

Another object of this invention is to provide an improved apparatus for laying an underground tubing or cable that is safe to operate by a sole operator.

Another object of this invention is to provide an improved apparatus for laying an underground tubing or cable that is economical to purchase and maintain.

The foregoing has outlined some of the more pertinent objects of the present invention. These objects should be construed as merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved apparatus for laying an underground member below a surface of the ground, comprising a frame with movement means secured to the frame for engaging the surface of the ground to facilitate movement of the frame thereover. A rotatable cutting blade is rotatably mounted relative to the frame with a portion of the cutting blade extending below the surface of the ground. A fixed cutting blade is mounted relative to the frame with a portion of the cutting blade extending below the surface of the ground. Securing means is disposed relative to the fixed cutting blade for securing the underground member thereto. An operating handle is pivotably mounted relative to the frame with coupling means interposed between the operating handle and the rotatable cutting blade for rotating the rotatable cutting blade upon a pivoting of the operating handle for enabling the rotatable cutting blade to cut the ground below the surface thereof. A propelling means cooperates with the operating handle for moving the apparatus over the surface of the ground to enable the rotatable cutting blade and the fixed cutting blade to cut a trench in the ground concomitantly with the securing means pulling the underground member through the trench for laying the underground member below the surface of the ground.

Preferably, the movement means includes a plurality of wheels secured to the frame for facilitating the movement of the frame over the surface of the ground.

In one embodiment of the invention, the coupling means comprises a ratchet and pawl interposed between the operating handle and the rotatable cutting blade for rotating the rotatable cutting blade upon a pivoting of the operating handle. Preferably, the ratchet is mounted relative to the rotatable cutting blade whereas the pawl is mounted relative to the operating handle.

In a specific embodiment of the invention, the fixed cutting blade is mounted relative to the frame in proximity to and in alignment with the rotatable cutting blade for enabling the fixed cutting blade to cut the trench in the ground subsequent to the rotatable cutting blade.

In one embodiment of the invention, the propelling means includes a propelling arm pivotably mounted relative to the operating handle for moving the apparatus over the surface of the ground upon the pivoting of the operating handle. Preferably, the frame comprises a first and a second side frame member disposed in a spaced apart parallel relationship with a shaft extending between the first and second side frame members. The rotatable cutting blade is rotatably mounted on the shaft whereas the operating handle is pivotably mounted on the shaft.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
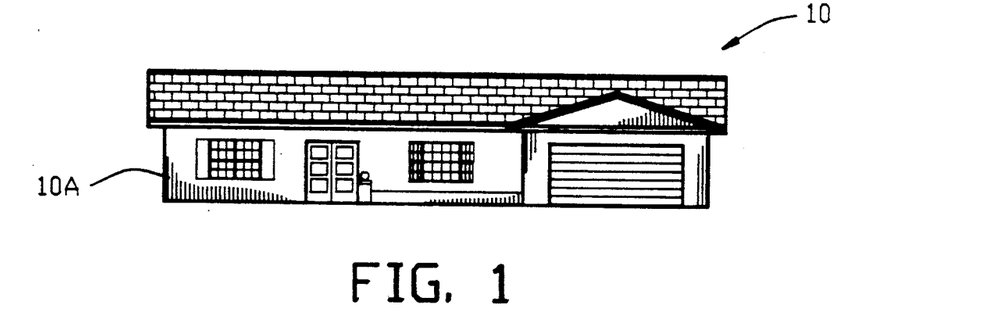
FIG. 1 is an elevational view of a house to receive an underground member such as a telephone wire or a television cable.
Figure 2:
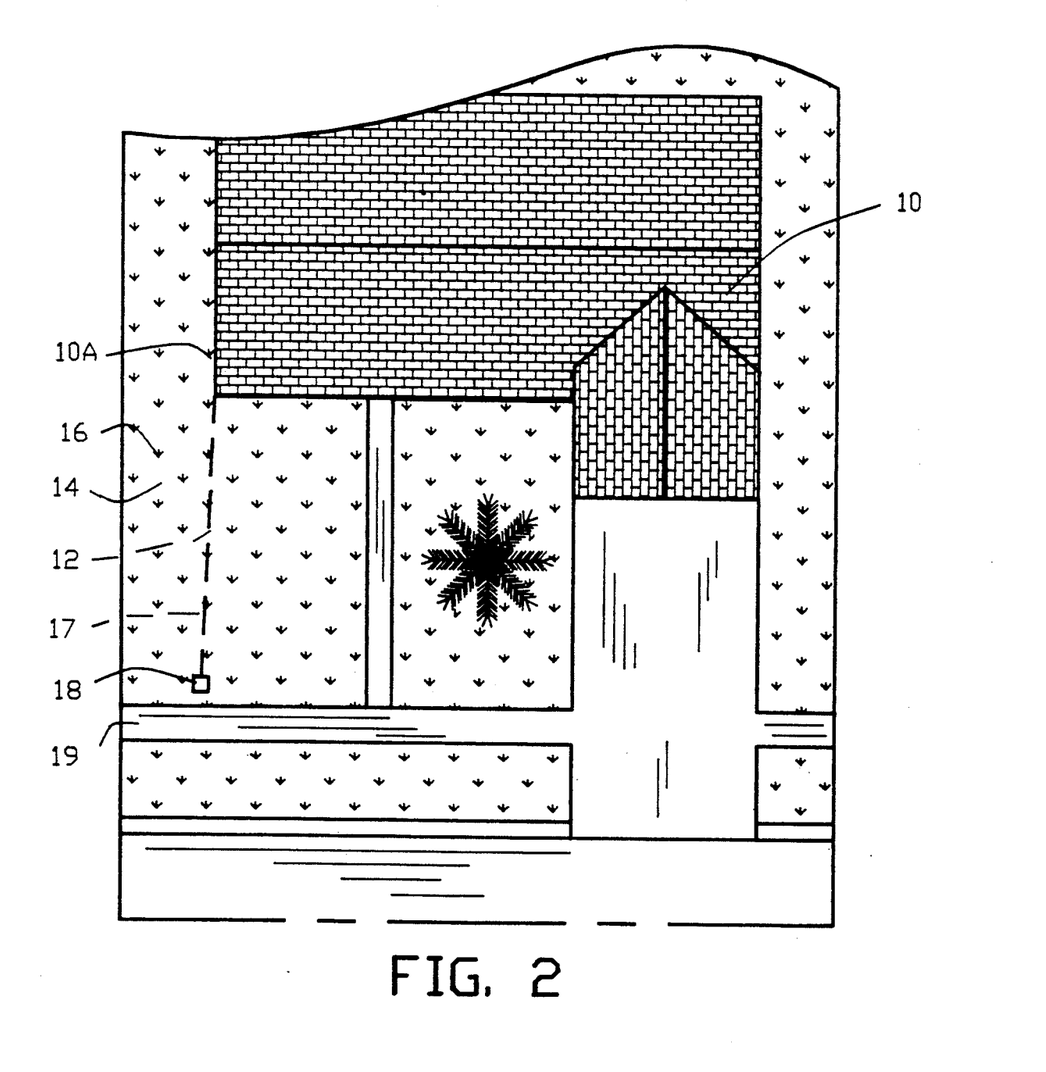
FIG. 2 is a partial site plan of the house of FIG. 1.

FIGS. 1 and 2 are front elevational and partial site plan views of a house 10 with an underground member 12 buried below a surface 14 of the ground 16 in a trench 17. The underground member 12 may be a telephone wire, television cable, fiber optic wire, electrical wire or other service wires. In the alternative, the underground member 12 may be an irrigation pipe or the like having a diameter of less than 0.5 inches. The house 10 is situated on a lot with a service box 18 disposed proximate sidewalk 19. The underground member 12 extends from the service box 18 to a sidewall 10A of the house 10.

Figure 3:
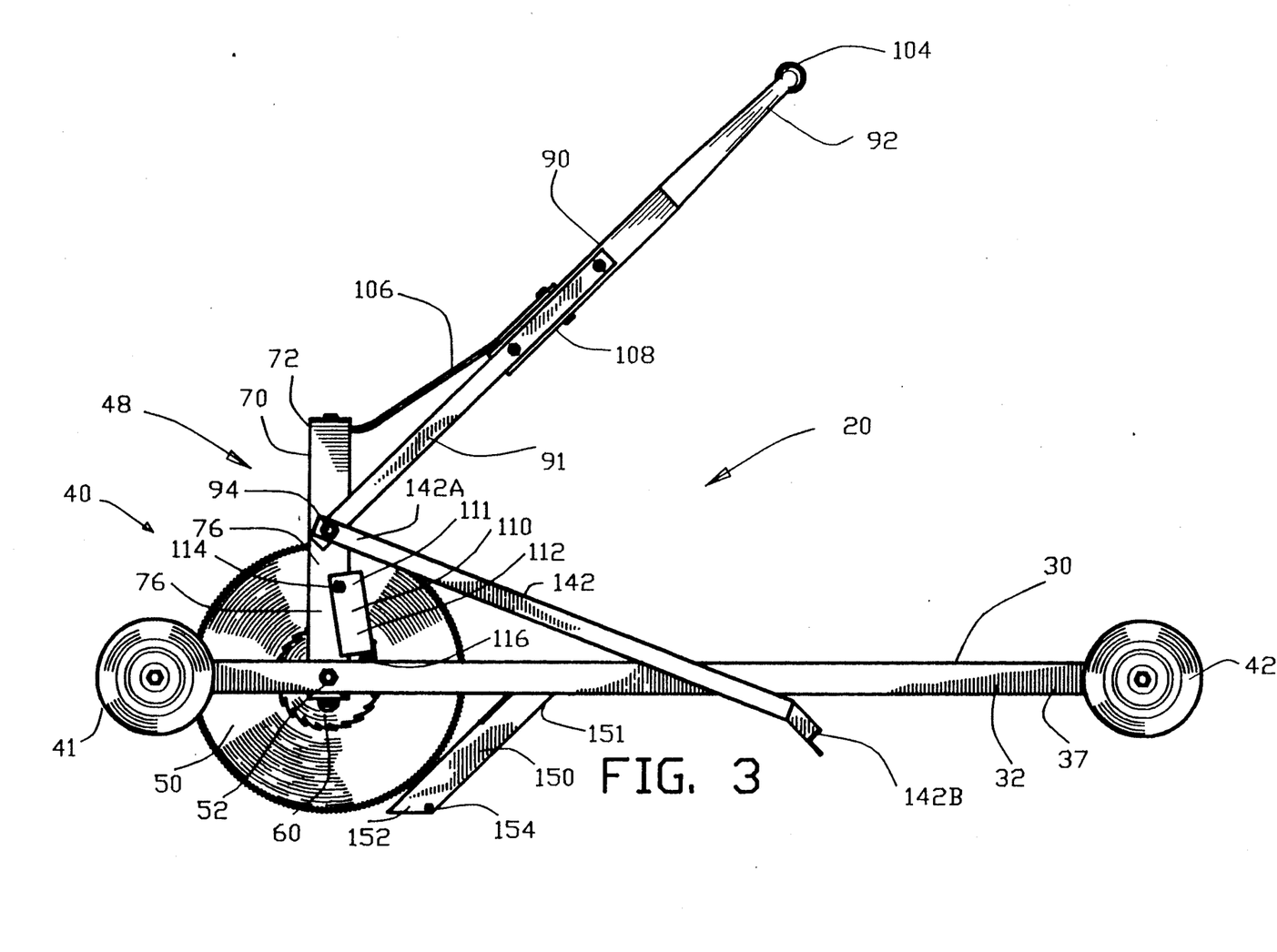
FIG. 3 is a side view of an apparatus for laying an underground member incorporating the present invention.
Figure 4:
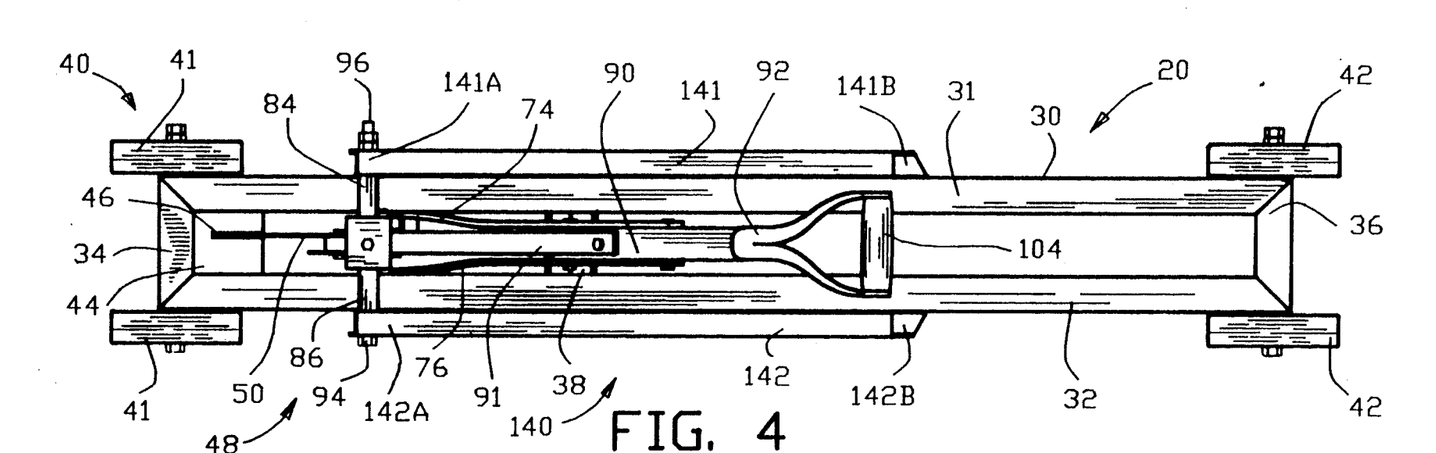
FIG. 4 is a top view of FIG. 3.
Figure 5:
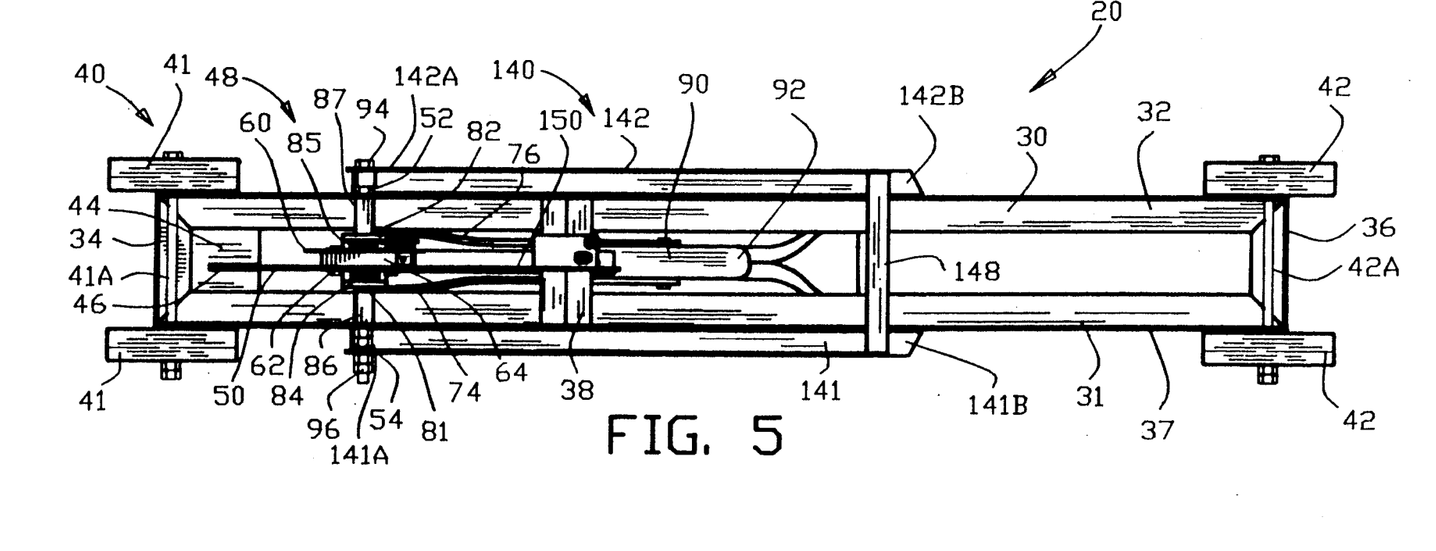
FIG. 5 is a bottom view of FIG. 3.
Figure 6:
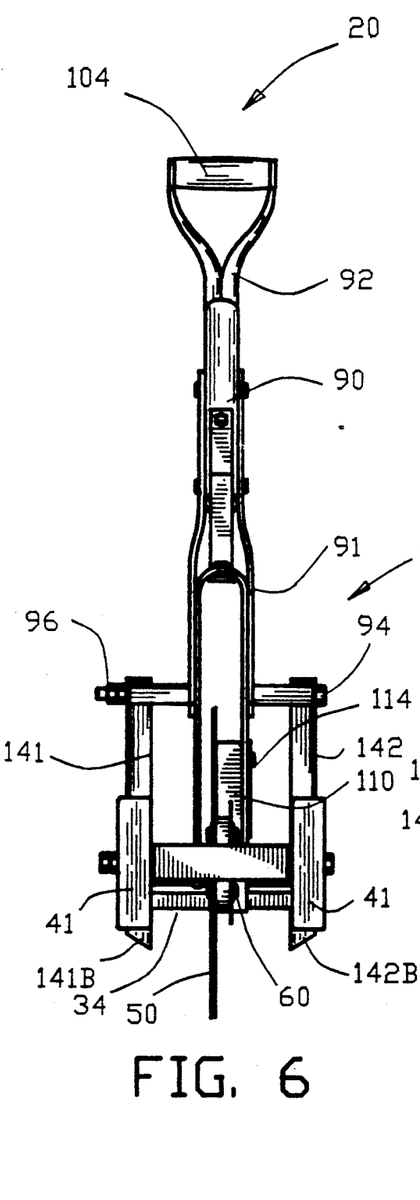
FIG. 6 is a front view of FIG. 3.
Figure 7:
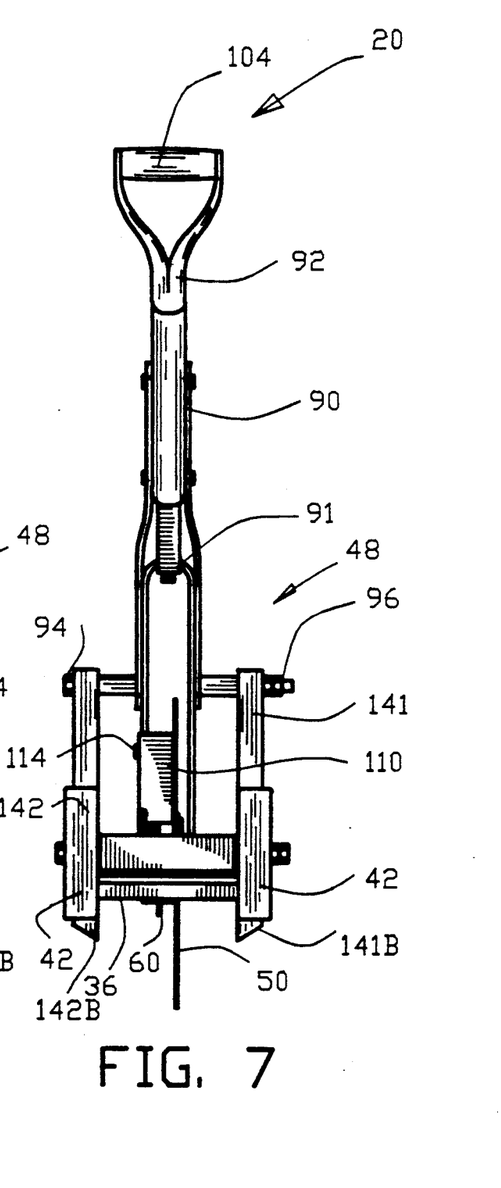
FIG. 7 is a rear view of FIG. 3.
Figure 8:
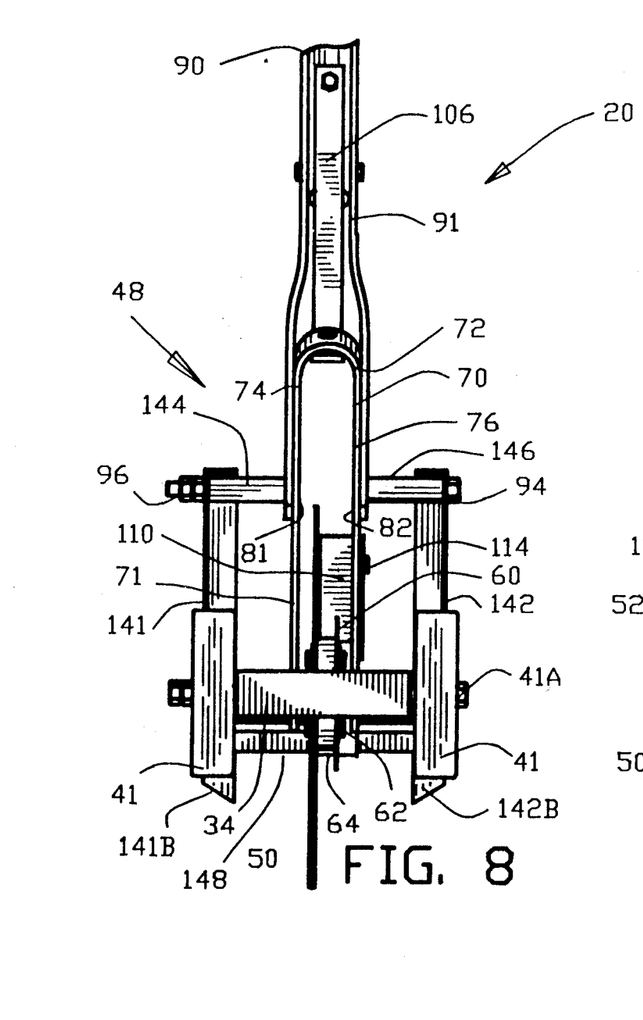
FIG. 8 is an enlarged partial view of FIG. 6 with an operating handle being shown in a first position.

FIG. 3 is a side view of an improved apparatus 20 for laying the underground member 12 incorporating the present invention. FIGS. 4 and 5 illustrate top and bottom views whereas FIGS. 6 and 7 illustrate front and rear views of the apparatus 20.

The apparatus 20 comprises a frame 30 having a first side frame member 31 and a second side frame member 32 interconnected by a front frame member 34 and a rear frame member 36. The first and second side frame members 31 and 32 and the front and rear frame members 34 and 36 and are illustrated as angle iron interconnected by welding or other mechanical means. An intermediate frame member 38 interconnects the first and second side frame members 31 and 32 and is interposed between the front frame member 34 and the rear frame member 36.

As shown in FIGS. 3 and 5, the first and second side frame members 31 and 32 and the front and rear frame members 34 and 36 are disposed with a portion 37 orientated downwardly. Although the frame 30 has been illustrated as angle iron, it should be understood that the frame 30 may be fabricated from other suitable material.

The frame 30 supports a movement means 40 shown as front wheels 41 and rear wheels 42. The front and rear wheels 41 and 42 are supported by front axle and rear axles 41A and 42A shown as bolts extending through apertures in the first and second side frame members 31 and 32 proximate the front and rear frame members 34 and 36. The front and rear wheels 41 and 42 are secured to the front and rear bolts by nut as shown. A guard 44 having a slit 46 is secured to the frame 30 proximate the front frame member 34.

A rotatable cutting blade 50 is rotatably mounted on a shaft shown as a bolt 52 extends through apertures in the first and second side frame members 31 and 32 between the intermediate frame member 38 and the front frame member 34 and being secured by nuts 54. Preferably, the rotatable cutting blade is a metallic saw blade of conventional design having a diameter of approximately 14 inches. The rotatable cutting blade 50 is positioned to extend into the slit 46 of the guard 44.

As more fully shown in FIGS. 8-11, a coupling means 48 includes a ratchet 60 is secured to the rotatable cutting blade 50 by a plurality of fasteners 62 shown as bolts and nuts and a disk shape spacer 64 for rotating with the rotatable cutting blade 50. The ratchet 60 includes a plurality of teeth 66.

A pivot arm 70 includes a first arm end 71 and a second arm end 72 with the first arm end 71 forming a U-shape defining a first arm element 74 and a second arm element 76. The first and second arm elements 74 and 76 include a first arm element aperture 81 and a second arm element aperture 82 for receiving the bolt 52 therethrough.

The first arm element 74 and the second arm element 76 straddle the rotatable cutting blade 50 with a first inner spacer 84 being interposed between the rotatable cutting blade 50 and the first arm element 74 of the pivot arm 70 and a second inner spacer 85 being interposed between the ratchet 60 and the second arm element 76 of the pivot arm 70. A first and a second outer spacer 86 and 87 are interposed between the first and second arm element 74 and 76 of the pivot arm 70 and the first and second side frames 31 and 32, respectively. The pivot arm 70 is pivotable about the bolt 52 between a first position shown in FIGS. 3, 6, 7, 8 and 9 and a second position shown in FIGS. 4, 5, 10 and 11.

The second arm end 72 of the pivot arm 70 supports an operating handle 90 having a proximal handle end 91 and a distal hand end 92. The proximal handle end 91 defines a U-shape for connecting to the first and second arm element 74 and 76 of the pivot arm 70 by a mechanical fastener shown as a bolt 94 and nuts 96 extending through openings in the first and second arm element 74 and 76. A handle grip 104 is located on a distal handle end 92 of the operating handle 90.

A brace 106 extends between an intermediate portion 108 of the operating handle 90 and the second arm end 72 of the pivot arm 70 and is secured by conventional mechanical fasteners. The proximal handle end 91 and the brace 106 form a triangular structure for fixing the angular position of the operating handle 90 relative to the pivot arm 70 for enabling the pivoting of the handle grip 104 of the operating handle 90 to pivot the pivot arm 70 about the bolt 52.

The coupling means 48 comprises an operating pawl 110 defines a first pawl end 111 and a second pawl end 112 with a pivot fastener 114 pivotably mounting the first pawl end 111 to the pivot arm 70 intermediate the first and second arm ends 71 and 72. The second pawl end 112 of the operating pawl 110 is biased into contact with the teeth 66 of the ratchet 60 by a spring 116 extending between a pawl aperture 118 and a hole 119 proximate the first arm end 71 of the pivot arm 70.

A propelling means 140 is shown as a first propelling arm 141 and a second propelling arm 142 having first and second proximal propelling ends 141A and 142A and first and second distal propelling ends 141B and 142B, respectively. The first and second proximal propelling ends 141A and 142A are rotatably mounted to the pivot arm 70 through the bolt 94 and nuts 96. A first and a second spacer 144 and 146 are disposed on the bolt 94 and are interposed between the first arm element 74 and the first propelling arm 141 and the second arm element 76 and the second propelling arm 142, respectively. A cross-arm 148 is secured between the first and second propelling arm 141 and 142 adjacent the first and second distal propelling ends 141B and 142B. The first and second proximal propelling ends 141A and 142A are disposed above the frame 30 whereas the first and second distal propelling ends 141B and 142B and the cross-arm 148 are disposed below the frame 30.

The first and second propelling arms 141 and 142 are shown as angle iron with the cross-arm 148 being welded therebetween. The first and second distal propelling ends 141B and 142B are adapted to engage with the surface 14 of the ground 16 as will be described in greater detail hereinafter.

Figure 9:
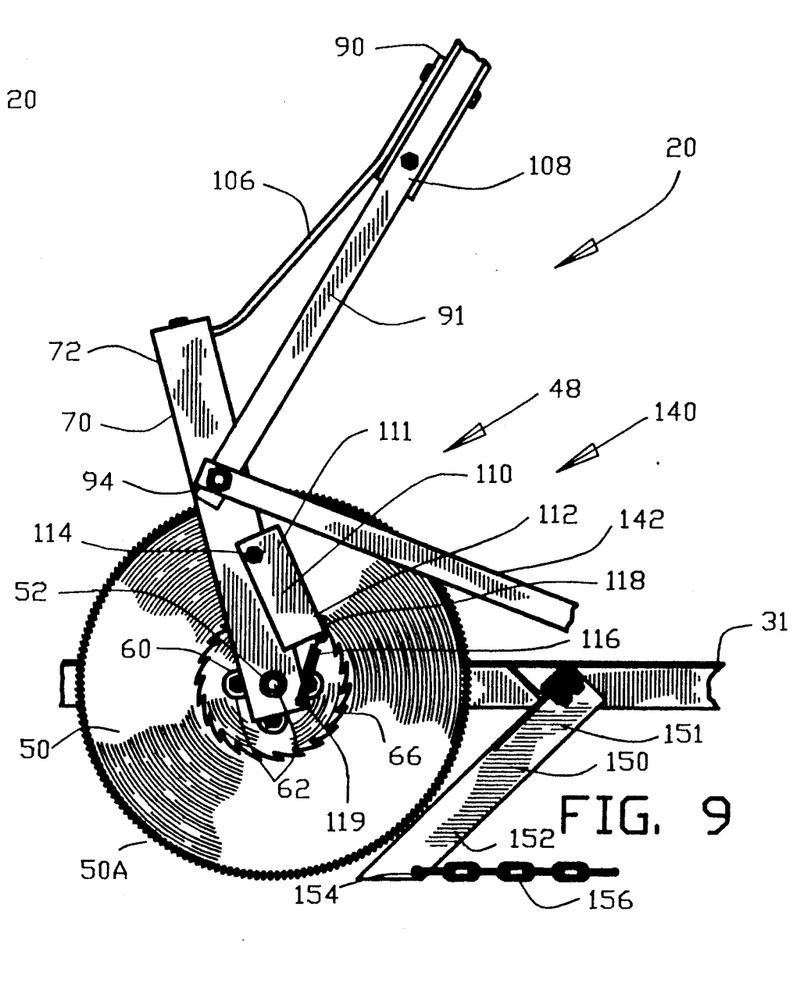
FIG. 9 is a side view of FIG. 8 with a portion of the frame being removed for clarity.
Figure 10:
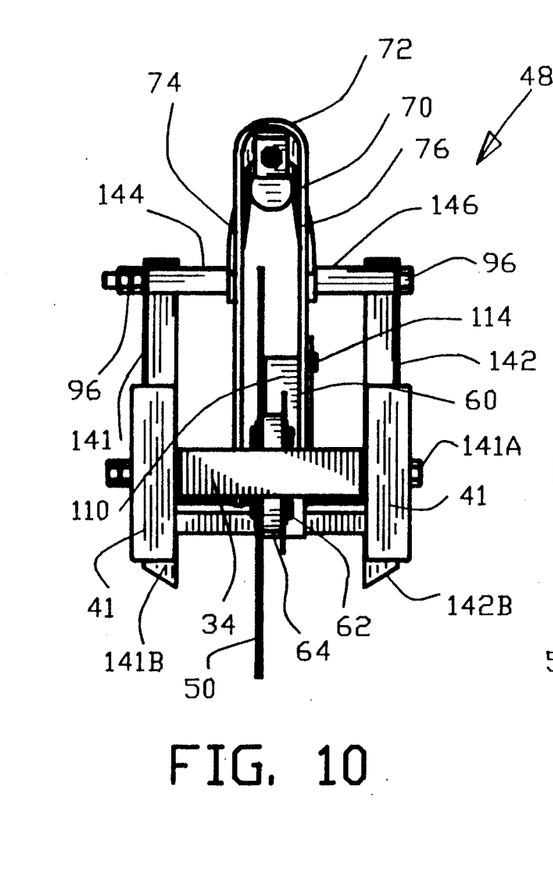
FIG. 10 is an enlarged partial view similar to FIG. 8 with the operating handle being shown in a second position.
Figure 11:
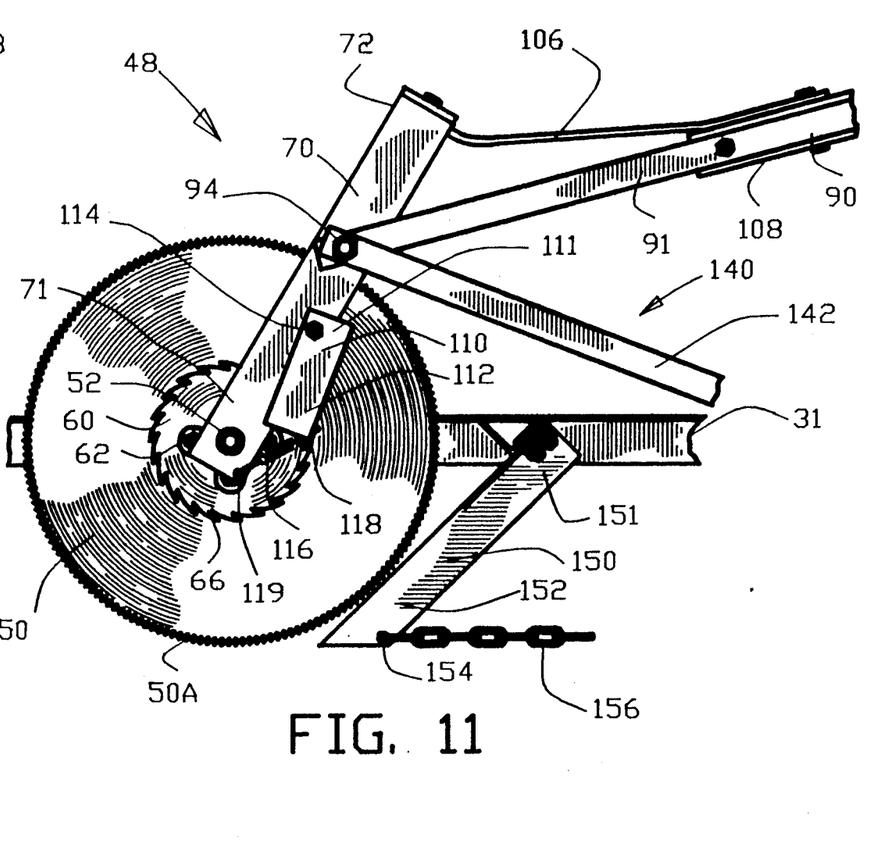
FIG. 11 is a side view of FIG. 10 with a portion of the frame being removed for clarity.

As best shown in FIGS. 9 and 11, the intermediate frame member 38 is secured to the first and second side frame members 31 and 32 to form an angle of forty-five degrees thereto. A fixed cutting blade 150 includes a first blade end 151 and a second blade end 152 with the first blade end 151 being secured to the intermediate frame member 38 to be angled in a forward direction. The second blade end 152 of the fixed cutting blade 150 extends to a level commensurate with a lower portion 50A of the rotatable cutting blade 50.

The second blade end 152 of the fixed cutting blade 150 includes securing means shown as a breach 154 for receiving a metallic connector shown as a chain 156 for pulling the underground member 12.

The operation of the apparatus 20 may be explained with respect to FIGS. 12-15 illustrating the laying of the underground member 12 below the surface 14 of the ground 16. Initially, the underground member 12 is affixed to the chain 156 and the apparatus 20 is placed on the surface 14 of the ground 16 with the operating handle 90 being raised into the first position. The first and second distal propelling ends 141B and 142B of the first and second propelling arms 141 and 142 are located approximately 2/3 from the front frame member 34.

Figures 12, 13:
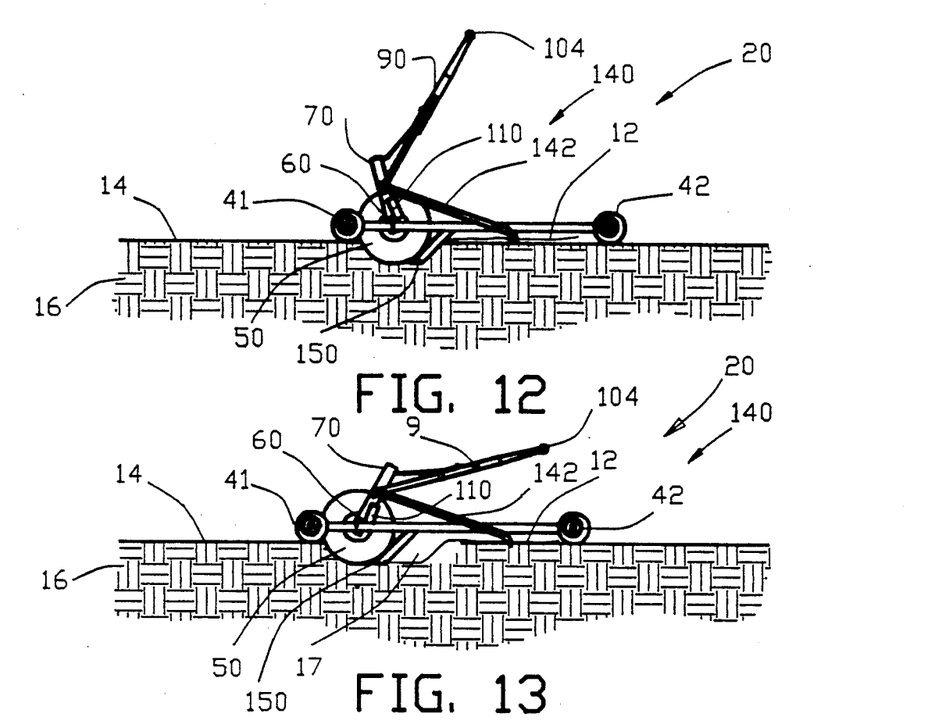
FIG. 12 is a side view partially in section of the apparatus of FIGS. 3-11 with a rotatable cutting blade and a fixed cutting blade disposed in the ground and with the operating handle being shown in the first position.
FIG. 13 is a side view similar to FIG. 12 with the operating handle being shown in a second position causing the apparatus to cut a trench and for advancing the apparatus over the ground.

As the operating handle 90 is pivoted downwardly to the second position as shown in FIG. 13, the pivot arm 70 rotates clockwise thereby engaging the second pawl end 112 with one of the teeth 66 of the ratchet 60. The engagement of the second pawl end pawl 112 with one of the teeth 66 causes a clockwise rotation of the rotatable cutting blade 50 as the operating handle 90 is pivoted downwardly. The rotatable cutting blade 50 cuts into the ground 16 to create the trench 17 without excessive downward force by the operator. In the alternative, a narrow trench sufficient for receiving the rotatable cutting blade 50 may be formed with a shovel. The slit 46 of the guard 44 removes excess debris from the rotatable cutting blade 50.

Concomitantly therewith, the first and second distal propelling ends 141B and 142B of the first and second propelling arms 141 and 142 engage with the surface 14 of the ground 16 such that the rotation of the operating handle 90 and the pivot arm 70 moves the apparatus 20 forward or to the left in FIG. 13. The first and second distal propelling ends 141B and 142B dig into the surface 14 of the ground 16 to propel the apparatus 20 in the forward direction.

Figure 14:
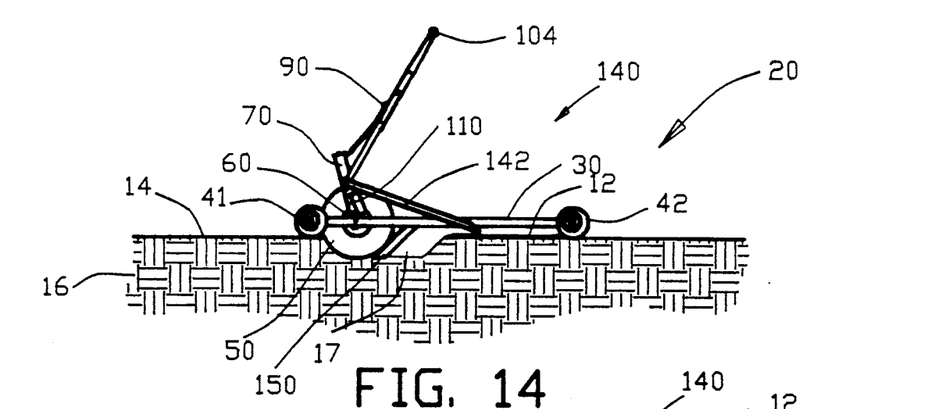
FIG. 14 is a side view similar to FIG. 13 with the operating handle being shown returned to the first position.

After the operating handle 90 has been pivoted to the second position as shown in FIG. 13, the operating handle 90 is returned to the first position as shown in FIG. 14. When the operating handle 90 is being returned to the first position, the second pawl end 112 disengages from the teeth 66 of the ratchet 60 to prevent rotation of the rotatable cutting blade 50. When the operating handle 90 is finally returned to the first position, the second pawl end 112 engages with a different one of the teeth 66 of the ratchet 60. Concomitantly therewith, the first and second propelling arms 141 and 142 are retracted to the position approximately 2/3 from the front frame member 34.

Figure 15:
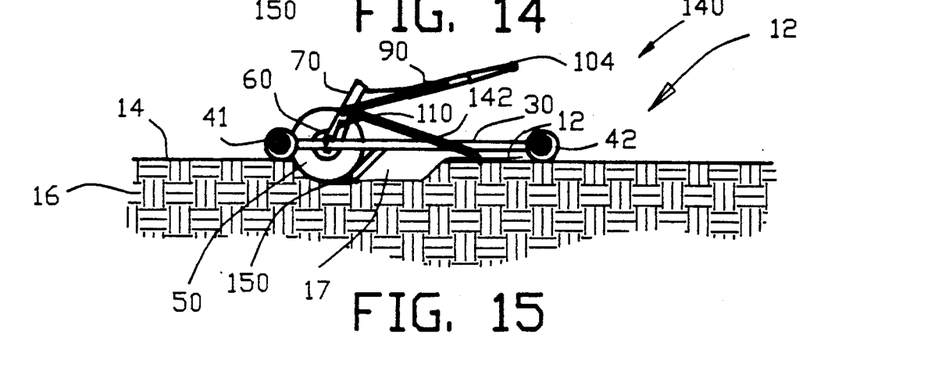
FIG. 15 is a side view similar to FIG. 14 with the operating handle being shown in the second position for further cutting the trench and for advancing the apparatus over the ground to lay the underground member.

As the operating handle 90 is again moved from the first position to the second position as shown in FIG. 15, the pivot arm 70 rotates the rotatable cutting blade 50 in a clockwise direction simultaneously with the first and second propelling arms 141 and 142 advancing the apparatus 20 forward as shown in FIG. 15. The apparatus 20 advances forward approximately ten inches upon movement of the operating handle 90 from the first position to the second position.

As the apparatus 20 is moved forward, the rotation of the rotatable cutting blade 50 cuts the ground 16 in front of the fixed cutting blade 150 to create the trench 17. The fixed cutting blade 150 provides a secondary cut in the trench 17 and buries the underground member 12 below the surface 14 of the ground 16. The chain 156 acts as an expander for creating a tunnel under the surface 14 of the ground 16 for the underground member 12.

The forward direction of the apparatus 20 may be altered by leaning the operating handle 90 to the left or to the right such that only one of the first and second propelling arms 141 or 142 advances the apparatus 20 forward thus turning the apparatus 20.

The foregoing apparatus 20 provides a simple, inexpensive and portable apparatus 20 for laying an underground member 12 for limited distance such as 50–200 feet when the use of a motorized trencher is unwarranted. The apparatus 20 may be easily and safely transported and used by a sole operator. The apparatus 20 creates a narrow trench sufficient for burying an underground member 12 at a uniform depth with no restoration required to the sward.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved apparatus for laying an underground member below a surface of the ground, comprising:
   a frame:
   movement means secured to said frame for engaging the surface of the ground to facilitate movement of said frame thereover;
   a rotatable cutting blade rotatably mounted relative to said frame with a portion of said cutting blade extending below the surface of the ground;
   a fixed cutting blade mounted relative to said frame with a portion of said cutting blade extending below the surface of the ground;
   securing means disposed relative to said fixed cutting blade for securing the underground member thereto;
   an operating handle pivotable mounted relative to said frame for movement between a first position and a second position;
   coupling means interposed between said operating handle and said rotatable cutting blade for rotating said rotatable cutting blade upon a pivoting of said operating handle from said first position to said second position;
   propelling means cooperating with said operating handle for moving the apparatus in a forward direction over the surface of the ground upon a pivoting of said operating handle from said first position to said second position;
   said coupling means being established for rotating said rotatable cutting blade in a rotational direction opposite to the forward direction of movement of the apparatus to enable said rotatable cutting blade to create a trench in the ground; and
   said fixed cutting blade providing a secondary cut in the trench in the ground with said securing means pulling the underground member through said trench for laying the underground member below the surface of the ground.

2. An improved apparatus as set forth in claim 1, wherein said frame comprises a first and a second side frame member disposed in a spaced apart parallel relationship; and
   said rotatable cutting blade and said fixed cutting blade being disposed between said first and second side frame members.

3. An improved apparatus as set forth in claim 1, wherein said movement means includes a plurality of wheels secured to said frame rotatable for facilitating the movement of said frame over the surface of the ground.

4. An improved apparatus as set forth in claim 1, wherein said coupling means comprises a ratchet and a pawl interposed between said operating handle and said rotatable cutting blade for rotating said rotatable cutting blade upon a pivoting of said operating handle.

5. An improved apparatus as set forth in claim 1, wherein said coupling means comprises a ratchet mounted relative to said rotatable cutting blade; and
   a pawl mounted relative to said operating handle for rotating said rotatable cutting blade upon a pivoting of said operating handle.

6. An improved apparatus as set forth in claim 1, wherein said fixed cutting blade is mounted relative to said frame in proximity to said rotatable cutting blade.

7. An improved apparatus as set forth in claim 1, wherein said fixed cutting blade is mounted relative to said frame in alignment with said rotatable cutting blade for enabling said fixed cutting blade to cut the trench in the ground subsequent to said rotatable cutting blade.

8. An improved apparatus as set forth in claim 1, wherein said securing means is disposed at a distal end of said fixed cutting blade for securing the underground member thereto.

9. An improved apparatus as set forth in claim 1, wherein said propelling means includes a propelling arm pivotably mounted relative to said operating handle for moving the apparatus over the surface of the ground upon the pivoting of said operating handle.

10. An improved apparatus as set forth in claim 1, wherein said frame comprises a first and a second side frame members disposed in a spaced apart parallel relationship;
    a shaft extending between said first and second frame element;
    said rotatable cutting blade being rotatably mounted on said shaft; and
    said operating handle being pivotably mounted on said shaft.

11. An improved apparatus for laying an underground member below a surface of the ground, comprising:

a frame:

a plurality of wheels secured to said frame rotatable for facilitating the movement of said frame over the surface of the ground;

a rotatable cutting blade rotatably mounted relative to said frame with a portion of said cutting blade extending below the surface of the ground;

a fixed cutting blade mounted relative to said frame with a portion of said cutting blade extending below the surface of the ground;

securing means disposed relative to said fixed cutting blade for securing the underground member thereto;

an operating handle pivotably mounted relative to said frame for movement between a first position and a second position;

a ratchet and pawl means interposed between said operating handle and said rotatable cutting blade for rotating said rotatable cutting blade upon a pivoting of said operating handle from said first position to said second position;

propelling means pivotable mounted relative to said operating handle for moving the apparatus in a forward direction over the surface of the ground upon a pivoting of said operating handle from said first position to said second position;

said ratchet and pawl means for rotating said rotatable cutting blade in a rotational direction opposite to the forward direction of advance of the apparatus to enable said rotatable cutting blade to create a trench in the ground with an absence of excessive downward force by an operators; and said fixed cutting blade providing a secondary cut in the trench in the ground with said securing means pulling the underground member through said trench for laying the underground member below the surface of the ground.

12. An improved apparatus as set forth in claim 11, wherein said frame comprises a first and a second side frame members disposed in a spaced apart parallel relationship;

a shaft extending between said first and second side frame members;

said rotatable cutting blade being rotatably mounted on said shaft; and said operating handle being pivotably mounted on said shaft.

13. An improved apparatus for laying an underground member below a surface of the ground, comprising:

a frame:

a plurality of wheels secured to said frame and being rotatable for facilitating the movement of said frame over the surface of the ground;

a rotatable cutting blade rotatably mounted on a shaft secured relative to said frame, with a portion of said cutting blade extending below the surface of the ground;

a fixed cutting blade mounted relative to said frame with a portion of said cutting blade extending below the surface of the ground;

securing means disposed relative to said fixed cutting blade for securing the underground member thereto;

an operating handle pivotable mounted on said shaft for movement between a first position and a second position;

a ratchet and pawl means interposed between said operating handle and said rotatable cutting blade for rotating said rotatable cutting blade upon a pivoting of said operating handle from said first position to said second position;

propelling means pivotable mounted to said operating handle and being space from aid shaft for moving the apparatus in a forward direction over the surface of the ground upon a pivoting of said operating handle from said first position to said second position;

said ratchet and pawl means for rotating said rotatable cutting blade in a rotational direction opposite to the forward direction of advance of the apparatus to enable said rotatable cutting blade to create a trench in the ground with an absence of excessive downward force by an operator; and said fixed cutting blade providing a secondary cut in the trench in the ground with said securing means pulling the underground member through said trench for laying the underground member below the surface of the ground.

* * * * *